United States Patent

Rushing et al.

[11] Patent Number: 5,434,884
[45] Date of Patent: Jul. 18, 1995

[54] APPARATUS AND METHOD FOR EQUALIZING FOR AMPLITUDE JITTER

[75] Inventors: Mickey C. Rushing, Harvest; Steven R. Blackwell, Huntsville, both of Ala.

[73] Assignee: Motorola, Inc., Schaumburg, Ill.

[21] Appl. No.: 317,429

[22] Filed: Oct. 4, 1994

Related U.S. Application Data

[63] Continuation of Ser. No. 827,783, Jan. 29, 1992, abandoned.

[51] Int. Cl.$^6$ ............................................. H03H 7/30
[52] U.S. Cl. ..................................... 375/235; 375/371
[58] Field of Search ..................... 375/13, 14, 15, 99, 375/118, 39; 370/105.3; 333/18

[56] References Cited

U.S. PATENT DOCUMENTS

| | | | |
|---|---|---|---|
| 4,027,250 | 5/1977 | Lang | 375/13 |
| 4,646,325 | 2/1987 | Zuranski et al. | 375/14 |
| 4,689,804 | 8/1987 | Srinivasagopalan | 375/15 |
| 4,777,640 | 10/1988 | Turner et al. | 375/118 |
| 4,953,186 | 8/1990 | Levy et al. | 375/118 |
| 4,985,900 | 1/1991 | Rhind et al. | 375/15 |

Primary Examiner—Stephen Chin
Assistant Examiner—T. Ghebretinsae
Attorney, Agent, or Firm—Nancy R. Gamburd

[57] ABSTRACT

A modem (100) includes an equalizer for equalizing a received signal (10) for amplitude jitter distortion. The received signal includes modulated symbols based on a predetermined constellation of points, each point representing a symbol. The modem first extracts a modulated symbol to provide an extracted symbol, R(k), which includes amplitude jitter distortion. The modem then identifies a signal point $P_n(k)$ of the predetermined constellation corresponding to the extracted symbol. Further, the modem determines an error signal (76) based on the amplitude jitter distortion, and then uses the error signal to compensate subsequent extracted symbols for the amplitude jitter distortion.

66 Claims, 4 Drawing Sheets

APPARATUS AND METHOD FOR EQUALIZING FOR AMPLITUDE JITTER

CROSS REFERENCE TO RELATED APPLICATION

This application is a file wrapper continuation of application Ser. No. 07/827,783, filed Jan. 29, 1992, now abandoned.

INCORPORATION BY REFERENCE OF ANOTHER U.S. PATENT

The applicant hereby incorporates by reference U.S. Pat. No. 4,777,640, Michael D. Turner et al., "Frequency Adaptive Phase Jitter Canceler", issued Oct. 11, 1988, verbatim and with the same effect as though the same patent were fully and completely set forth herein.

1. Field of the Invention

This application relates to communication signal receiving apparatus and method including, but not limited to, apparatus and method for compensating the received communication signal for at least amplitude jitter in order to retrieve modulated digital data therefrom.

2. Background of the Invention

Presently, data communication equipment ("DCE"), such as modems, for example, are being used to transport digital data between data terminal equipment ("DTE") such as personal computers, workstations and the like, over channels such as, for instance, telephone lines. In some instances, the communication signal is modulated to include digital data in the form of a train of symbols based on a predetermined transmit constellation of signal points. Each signal point of the transmit constellation represents a digital code or value. Each symbol is modulated substantially at the signal point of the transmit constellation corresponding to the value desired to be represented thereby in the train, and thus transported over the channel. At the receiving DCE, the symbols are extracted from the communication signal and a signal point is identified from a receive constellation of signal points corresponding to each extracted symbol. The signal points are used to retrieve the digital data from the modulated communication signal.

In communicating the communication signals over the telephone network, a source of distortion thereof is known as jitter distortion and is caused primarily by the coupling of sinusoidal distortion from 60 Hz power lines and/or the 20 Hz ringing signal. An equalizer function is commonly used in the receiving DCE to remove linear distortion from the received communication signals, but because of low update gains, an equalizer is unable to remove the jitter distortion components.

Jitter distortion is comprised of phase and amplitude components. It has been recognized that the phase jitter component of the jitter distortion has the major effect on modem performance when using conventional receive constellations for standard data communication formatting between modems. Accordingly, contemporary modem receivers include one or more phase jitter cancelling circuits for reducing the sinusoidal components of phase jitter in the communications channel. An example of such a phase jitter canceling circuit may be found in the Michael D. Turner et al. U.S. Pat. No. 4,777,640, which patent has been incorporated by reference hereinabove.

Because of the spread in signal points of the conventional receive constellations, the amplitude jitter component of the jitter distortion has little effect on the modem's performance. However, higher data bit rate communication is contemplated in the near future. Since the bandwidth of the communication channel is substantially fixed, increasing data bit rates is accomplished by increasing the number of signal points of a receive constellation, thereby compressing the distances therebetween. Consequently, high speed modems incorporating these compressed receive constellations are likely to be more susceptible to amplitude jitter. For example, in a contemplated 19.2K bits per second high speed modem receiver as little as 2% amplitude jitter can affect the modem's performance. Under these conditions, amplitude jitter affects the signal to distortion performance of the high speed modem in the same way that phase jitter affects performance of a lower speed modem. Accordingly, it is desirable for the contemplated higher speed modems to include not only phase jitter cancellation to compliment the equalizer function thereof, but also to include an amplitude jitter cancelling function to further improve performance.

SUMMARY OF THE INVENTION

A modem is disclosed for receiving a signal, the signal including modulated symbols based on a predetermined constellation of points, each point representing a symbol. The modem includes:

means for extracting modulated symbols to provide an extracted symbol, R(k), the extracted symbol including amplitude jitter distortion, identifying means for identifying a signal point $P_n(k)$ of the predetermined constellation corresponding to the extracted symbol, based on a predetermined criteria;

determining means for determining an error signal representative of the amplitude jitter distortion based on the extracted symbol and the signal point; and compensating means responsive to the error signal for compensating at least one subsequent extracted symbol for the amplitude jitter distortion prior to the identifying means identifying the signal point corresponding thereto.

DETAILED DESCRIPTION

Figure 1:
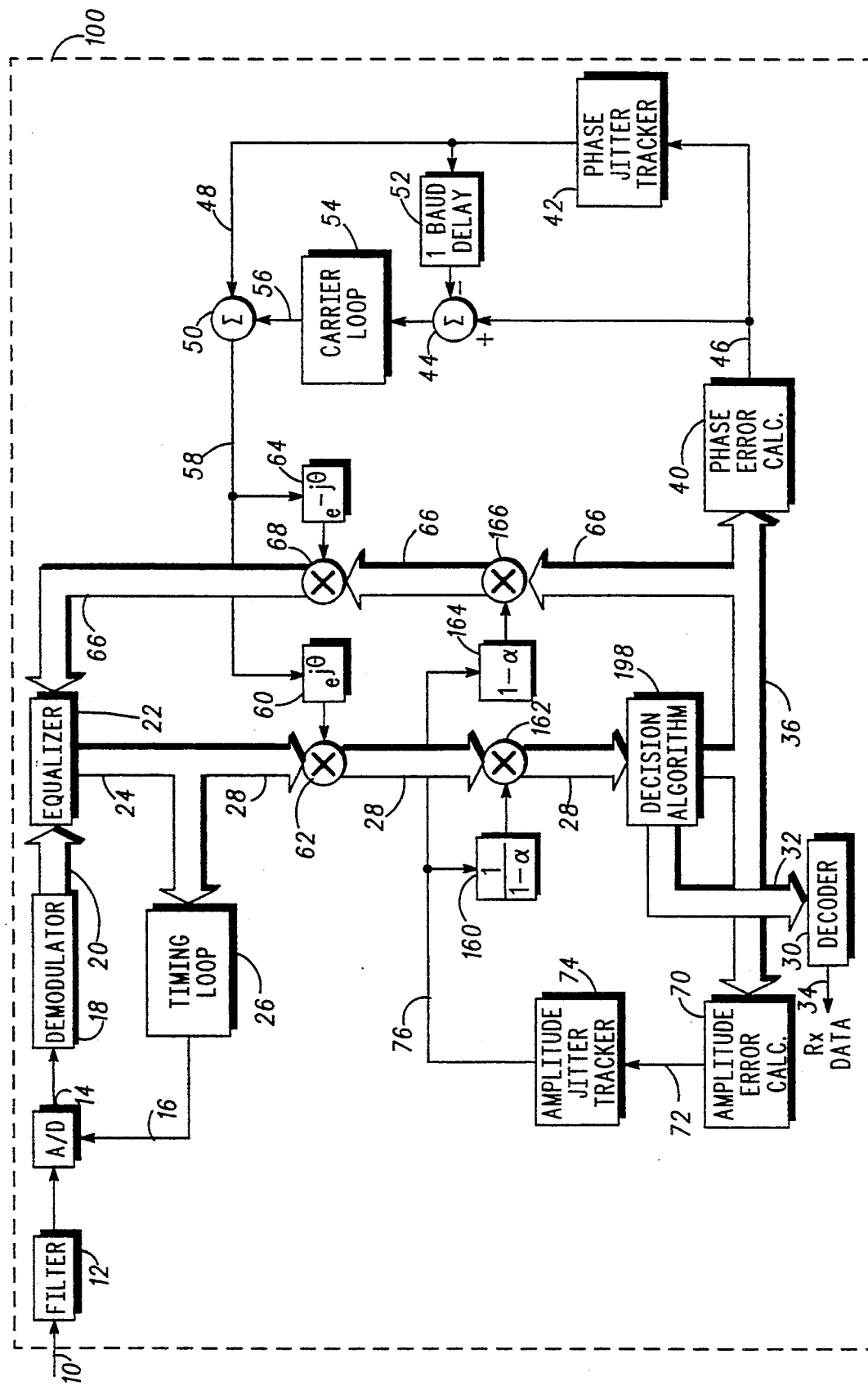
FIG. 1 is a block diagram schematic of a first embodiment of a modem including an equalizer for amplitude jitter, in accordance with the invention.

FIG. 1 is a block diagram schematic of a modem 100 including a receiver that is being used, by way of example, as a receiving portion of a DCE. Referring, to FIG. 1, the received signal 10 that has been transported by a channel which, for example, may be a telephone line, includes jitter distortion. Generally the signal 10 will include modulated symbols based on a predetermined constellation. As is known, the constellation includes a plurality of points, each point representing a symbol. Each symbol, in turn, represents a value to be transported.

The incoming signal 10 is first filtered and amplified by a conventional low pass filter 12 which may include an automatic gain control circuit. Next, the filtered signal undergoes analog-to-digital ("A/D") conversion by a converter 14 at a controlled sampling rate governed by a sampling signal 16. The sampled digital data of the A/D converter 14 is demodulated by a conventional demodulator 18 and the demodulated output 20 is equalized by an equalizer function 22. In the present embodiment, the equalizer may be of the classical least-means-squared type, for example.

The output of the equalizer 22 is an equalized receive signal 24 which governs a conventional timing loop 26 to provide the sampling signal 16. In the present embodiment, the sampling rate is adjusted to approximately four times the symbol or baud rate of the incoming train of symbols forming the received signal 10. The combination of elements 14, 18, 22 and 26 provide the function of extracting the modulated symbols of the train from the received signal 10 and providing them, as extracted symbols, to a decision algorithm 198 via the signal line 28. In general, the kth extracted symbol may be referred to as R(k).

In the decision algorithm 198, a signal point $P_n(k)$ of the predetermined receive constellation corresponding to an extracted symbol R(k) is identified based on a predetermined criteria. In the present embodiment, the criteria used for signal point identification is based on the closest signal point of the receive constellation to the extracted symbol. Once the signal point $P_n(k)$ is identified, it may be used to retrieve the value corresponding thereto.

Figure 2:
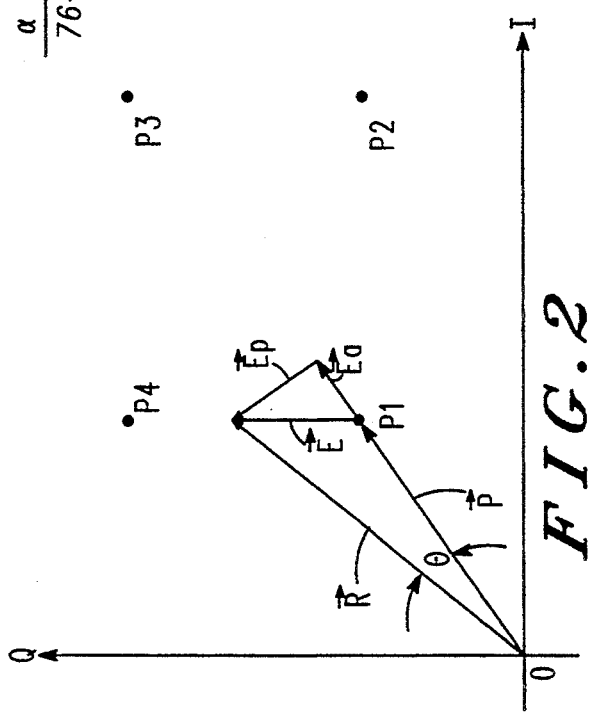
FIG. 2 is a graph depicting a signal point constellation.

FIG. 2 is a graph which illustrates the signal point identification process. Since each extracted symbol includes an inphase I and quadrature Q component, the abscissa (or "X") axis and ordinate (or "Y") axis of the graph represent the respective I and Q components. While the graph of FIG. 2 exhibits only quadrant 1 of the receive constellation including signal points P1-P4, it is understood that the principles described also apply to the other three quadrants of the receive constellation as well.

Accordingly, an extracted symbol may be represented by a vector such as that shown by vector R and each signal point may be represented by vectors as well. In the present embodiment, error vectors E may be measured from each of the signal points of the received constellation to the extracted symbol vector R under consideration and the signal point having the smallest magnitude error vector is considered the identified signal point. In FIG. 2, signal point P1 has the smallest error vector to the extracted symbol vector R and thus is considered the closest.

Once the decision algorithm 198 identifies the signal point $P_n(k)$ corresponding to the extracted symbol R(k), the signal point $P_n(k)$ is applied to a decoder 30 over signal path 32. In the decoder 30, the digital data corresponding to the identified signal point $P_n(k)$ is retrieved. The data is then output over path 34 as received bits.

In addition, the decision algorithm 198 applies the associated error signal E(k), that is based on the extracted symbol R(k) and the signal point $P_n(k)$, to the equalizer 22 over signal paths 36 and 66. The equalizer 22 includes compensating means responsive to the error signal for compensating the subsequent extracted symbol, R(k+1). Since the equalizer 22 is situated before the decision algorithm 198 in the signal path, the subsequent compensation will occur prior to the decision algorithm identifying the signal point $_n(k+1)$ corresponding to the subsequent extracted symbol. Thus, the equalizer 22 utilizes the error signal E(k) for adjustment thereof in order to reduce the magnitude of the subsequent error for the subsequent extracted symbol, R(k+1). As discussed above, the equalizer 22 is generally unable to remove jitter distortion from the received signal.

For purposes of explanation, the extracted symbol R, as depicted in the graph of FIG. 2, is considered to include only jitter type distortion. Accordingly, the error vector E then is comprised of both an amplitude jitter distortion component and a phase jitter distortion component. In the graph, the amplitude jitter distortion component is represented by $E_a$ and is in line with the vector of the identified signal point P1. In addition, the phase jitter distortion component represented by $E_p$ and is perpendicular to the identified signal point vector.

To compensate for the phase jitter distortion component, the error signal E(k) of path 36 is applied to a phase error calculator 40 which separates out a phase jitter distortion distortion error signal 46 therefrom that is applied to a phase jitter tracker 42 and also to a summer 44. The phase jitter tracker 42 is responsive to the phase jitter distortion error signal 46 to provide a phase jitter distortion angle signal 48 that is applied to a summer 50 and also to a delay function 52 which delays the phase jitter distortion angle term approximately 1 baud or symbol time interval before subtracting it from the phase jitter distortion term 46 in the summer 44. The output of the summer 44 governs a carrier loop function 54 to provide a carrier angle term 56 that is summed with the phase jitter distortion angle term 48 in the summer 50 to produce a total phase angle compensation term 58 that is represented by the symbol $\theta$.

A phase compensating signal $e^{j\theta}$ is formed from the compensating signal 58 in the block 60 and used to compensate the subsequent extracted symbol R(k+1) of path 28 utilizing a multiplier 62 disposed in the signal path 28. In addition, another compensating signal $e^{-j\theta}$ is generated in a block 64 from the compensating signal 58 and is used to compensate the error signal of path 36 to effect a phase compensated error signal 66 for adjusting the equalizer 22. In the present embodiment, the compensating signal of block 64 multiplies the error signal using a multiplier 68 disposed in the error signal path 36. For more details of the foregoing described phase jitter distortion compensation portion of the modem, refer to the aforementioned U.S. Pat. No. 4,777,640 which has been incorporated by reference hereinabove.

Further in regard to the present embodiment, the error signal E(k) of path 36 is applied to an amplitude error calculator 70 for deriving a normalized amplitude jitter distortion error signal 72. In the present embodiment, the calculator 70 projects the error vector E(k) of the corresponding extracted signal R(k) onto the vector of the identified signal point $P_n(k)$ to derive an unnormalized error signal $E_a(k)$. In addition, the error signal $E_a(k)$ is normalized by dividing it by the absolute value of the identified signal point vector $P_n(k)$ to derive the normalized error signal $E_n(k)$ 72.

In the present embodiment, the unnormalized error signal $E_a(k)$ is derived in the calculator 70 based on the following equation:

$$E_a(k) = \frac{E_xP_x + E_yP_y + i(E_xP_y - E_yP_x)}{|P_n(k)|}$$

where:
- $E_x$ = the inphase component of $E(k)$;
- $E_y$ = the quadrature component of $E(k)$;
- $P_x$ = the inphase component of $P_n(k)$; and,
- $P_y$ = the quadrature component of $P_n(k)$.

Moreover, the normalized error signal $E_n(k)$ is derived based on the following equation:

$$E_n(k) = \frac{E_a(k)}{|P_n(k)|}.$$

In connection with the compensation of the amplitude jitter distortion, an amplitude jitter tracker 74 is responsive to the normalized error signal $E_n(k)$ 72 to provide a compensating signal over path 76.

Figure 3:
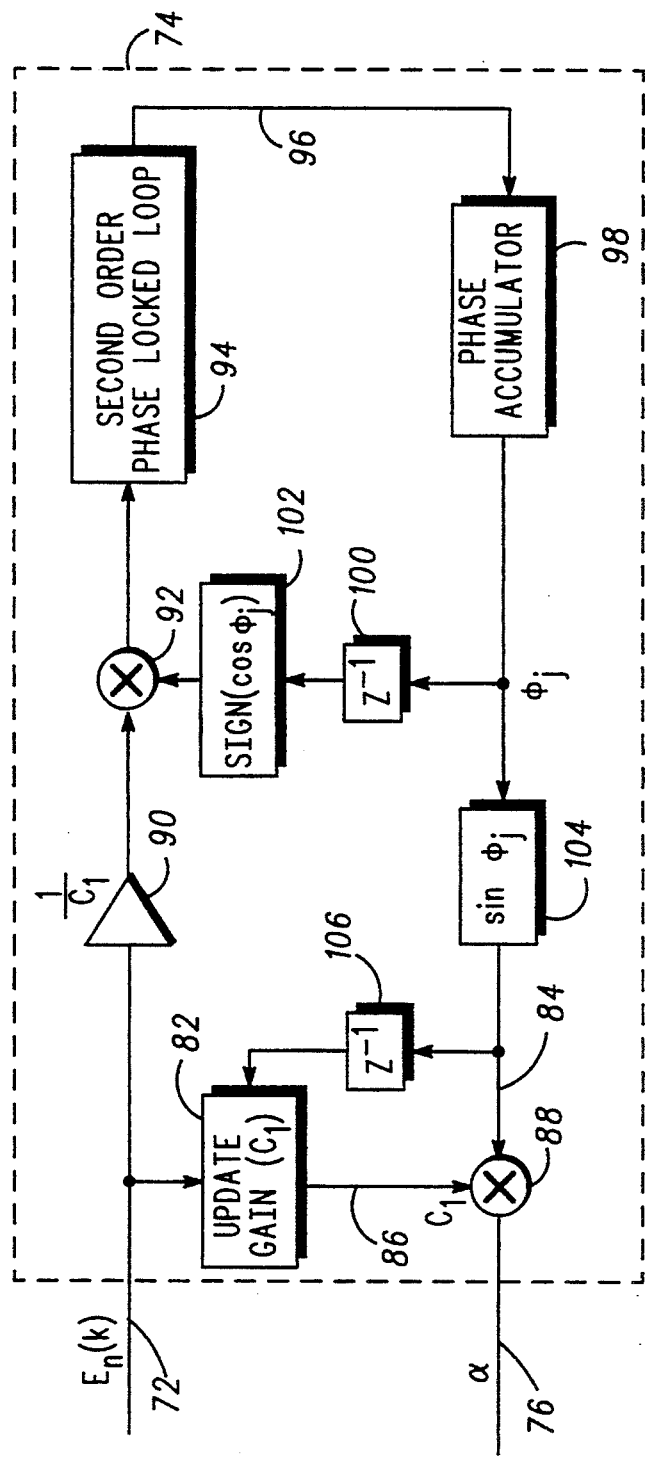
FIG. 3 is a block diagram schematic of a first amplitude jitter tracker.

FIG. 3 is a block diagram schematic of an amplitude jitter tracker 74 suitable for use in the embodiment of FIG. 1. Since the amplitude jitter distortion includes at least one sinusoidal component having an amplitude and a frequency, the amplitude jitter tracker 74 includes a second-order phase locked loop 94 and a phase accumulator 98 responsive to the normalized error signal $E_n(k)$ for providing a compensating signal frequency value 84 and a circuit 82 responsive to the error signal for providing a compensating signal amplitude value $c_1$ at 86. The amplitude value 86 and the frequency value 84 am applied to a multiplier 88, which provides the composite compensating signal 76, represented by the Greek symbol $\alpha$.

The function of the amplitude jitter tracker 74 in the present embodiment, is to match the compensating signal 76 to the amplitude jitter distortion of the extracted symbols such that compensation thereof converges the corresponding error signals to a steady state value, preferably substantially zero.

More specifically, for each extracted symbol $R(k)$, the normalizer block 90 normalizes the corresponding error signal $E_n(k)$ 72 by dividing it with the derived amplitude term $c_1$ to remove substantially amplitude variations thereof. The output of the normalizer 90 is then applied to one input of a multiplier 92. The output of the multiplier 92 drives a second-order phase lock loop 94 that is used to track and update an incremental phase 96 of the frequency term in the proper direction. The resulting incremental phase tracking signal 96 is applied to a phase accumulator 98 which generates a phase term $\phi_j$ for the subsequent extracted symbol $R(k+1)$.

The phase term $\phi_j$ is delayed by approximately one-symbol time interval b the delay block 100 and applied to block 102 wherein the sign of cos $\phi_j$ is derived and applied to another input of the multiplier 92 for multiplying the normalized error signal $E_n(k)$ 72 to insure that the phase lock loop 94 is updating the incremental phase 96 in the proper direction for each extracted symbol.

In addition, the compensating signal frequency value 84 is computed by establishing the sine of the phase term $\phi_j$ in block 104. In operation, the compensating signal frequency value 84 is matched to the frequency of the sinusoidal amplitude jitter distortion of subsequent extracted symbols such that compensation of the subsequent extracted symbols with the frequency value 84 converges the corresponding error signals to substantially zero values.

Moreover, the circuit 82 of the amplitude jitter tracker 74 operates to correlate the normalized error signal $E_n(k)$ 72 with the frequency value 84 via a one-symbol delay through block 106, thus substantially removing any sinusoidal variations from the amplitude value 86. The circuit 82 operates to match the amplitude value 86 to the amplitude of the sinusoidal component of the amplitude jitter distortion such that compensation of subsequent extracted symbols with the amplitude value 86 converges the corresponding error signals to substantially zero values.

Figure 4:
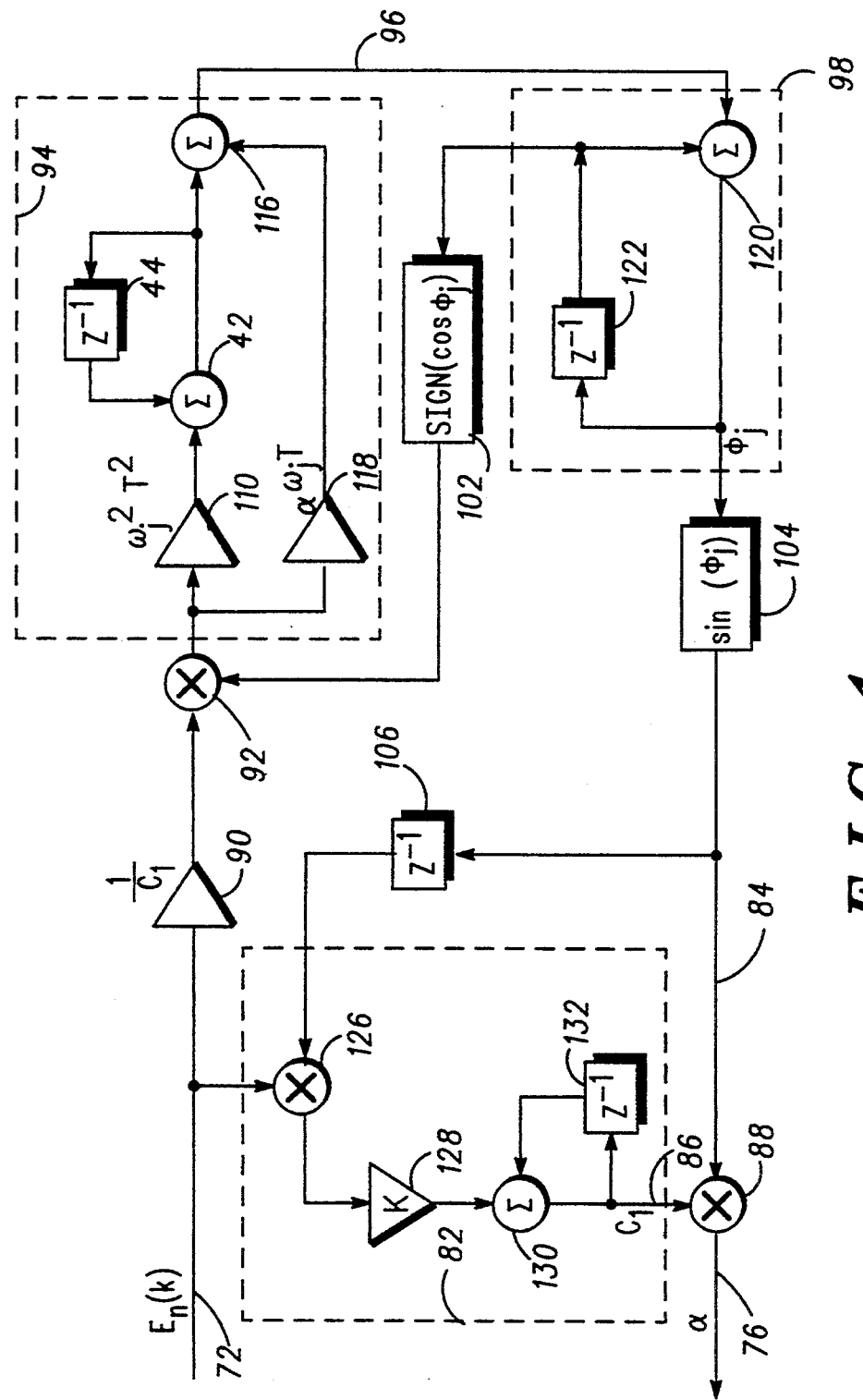
FIG. 4 is a block diagram schematic depicting further detail for the amplitude jitter tracker of FIG. 3.

FIG. 4 depicts the second-order phase lock loop 94, phase accumulator 98 and the circuit 82 in further detail. Referring to FIG. 4, the output of the multiplier 92 is operated on by a gain term $w_j^2T^2$ in block 110. Further, the output of block 110 is accumulated in an accumulator formed by the summer 112 and a one-symbol time interval delay 114. The accumulated result is applied to one input of a summer 116. The output of multiplier 92 is also operated on by a gain term $aw_jT$ in block 118, where a is a constant, and the result is applied to another input of the summer 116. The result of the summer 116 becomes the estimated incremental phase 96 for the subsequent extracted symbol and is applied to the accumulator 98 that is formed by a summer 120 and a one-symbol delay 122. The output of the accumulator 98 provides the phase term $\phi_j$ for the subsequent extracted symbol.

Moreover, the circuit 82 includes an adaptive update filter. More particularly, the error signal $E_n(k)$ 72 is multiplied by the frequency value 84, delayed by a one-symbol time interval 106, in a multiplier 126. The output of the multiplier 126 is operated on by a gain K in block 128 and the resultant signals for each of the extracted symbols are accumulated by an accumulator formed by a summer 130 and a one-symbol time interval delay 132. The accumulation results in tile amplitude value 86, which is substantially free of sinusoidal variations, and has an average that is correlated with the amplitude of the error signal $E_n(k)$ 72.

Figure 5:
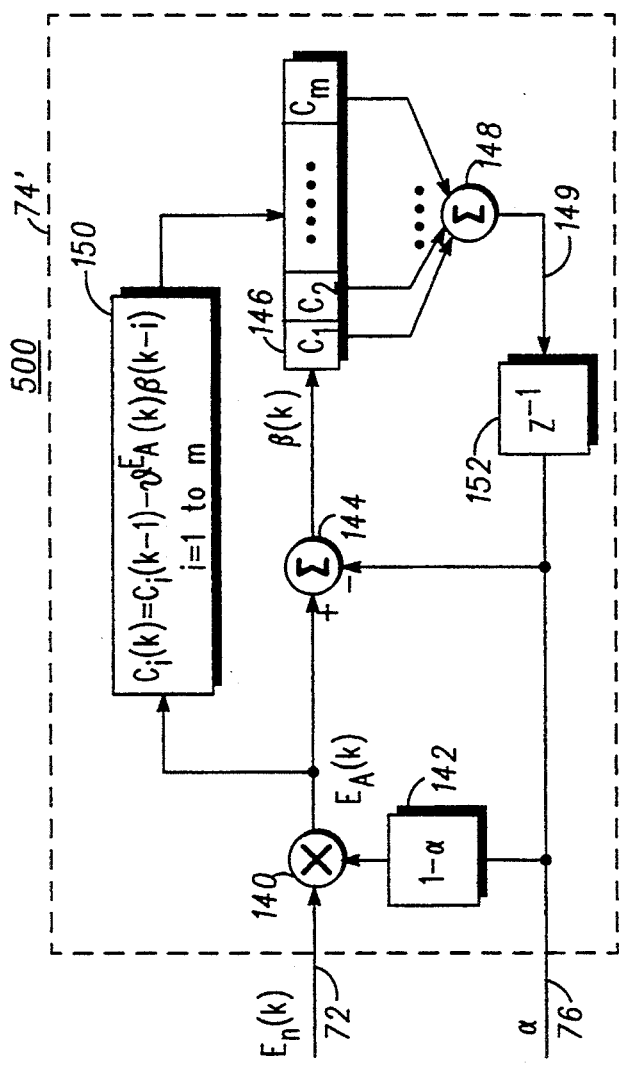
FIG. 5 is a block diagram schematic depicting a second amplitude jitter tracker.

FIG. 5 depicts an alternate embodiment 400 of an amplitude jitter tracker 74' suitable for use in the modem of FIG. 1. This alternate embodiment includes a linear predictor function that is responsive to the normalized error signal $E_n(k)$ 72 to provide the compensating signal $\alpha$ 76 for use in compensating subsequent extracted symbols. The error signal $E_n(k)$ 72 is compensated by a signal formed as a function of the compensating signal $\alpha$ 76 in a multiplier 140 to provide an intermediate error signal $E_A(k)$. In the present embodiment, a block 142 forms the signal for compensating the error signal as $1-\alpha$. Still further, the compensating signal $\alpha$ 76 is subtracted from the intermediate error signal $E_A(k)$ in a summer 144 to provide a second intermediate error signal $\beta(k)$. A delay line 146 having a plurality m of tapped delay stages is operative to conduct the second intermediate error signal $\beta(k)$ through the plurality of delay stages thereof. The contents of each stage i being operated on by a corresponding stage gain $c_i$ to provide a corresponding plurality of tapped output signals which are summed in a summer 148 to produce an estimate 149 of the compensating signal $\alpha$ 76 for the subsequent extracted symbol. Each of the stage gains $c_i$ is updated as a function of the intermediate error signal $E_A(k)$ as shown in the bloc 150. A one-symbol delay 152 operates on the estimate 149 to derive the compensating signal α 76.

Referring again to FIG. 1, a signal is formed as a function of the compensating signal of path 76 in the block 160 for use in compensating the subsequent extracted symbol over path 28 to provide a compensated extracted symbol for use in the decision algorithm 198 to identify the signal points corresponding thereto. In the present embodiment, the extracted symbol of path 28 is compensated by the signal (1/1-α) formed by block 160 by multiplying the extracted symbol thereby utilizing a multiplier 162 disposed in the path 28. Similarly, the; error signal over path 66 for use in adjusting the equalizer 22 is compensated by a signal (1-α) formed in block 164 as a function of the compensating signal α 76 to provide a compensated error signal over path 66. In the present embodiment, the signal formed by block 164 multiplies the error signal of path 66 by a multiplier 166 disposed in the path 66.

Moreover, the equalized extracted symbols of path 28 are compensated for both amplitude jitter distortion and phase jitter distortion utilizing the respectively corresponding amplitude jitter tracker 74 and phase jitter tracker 42 in connection therewith prior to identifying the signal points thereof through use of the decision algorithm 198. Once the extracted symbols are compensated for the jitter distortion, the resultant compensated symbols are closer to their intended signal points so that identification of the proper signal point will be achieved, thereby improving performance of the modem receiver.

Returning again to FIG. 1, those skilled in the art will appreciate that the filter 12, the, A/D converter 14, the demodulator 18, the timing loop 26, the decoder 30,, and the decision algorithm 198 depicted therein perform typical modem functions, whereas the remaining elements collectively interact to perform a general equalizing function.

As described hereinabove, the method of the present invention includes extracting modulated symbols to provide an extracted symbol, R(k), in which the extracted symbol may include amplitude jitter distortion. Based on a predetermined criterion, a signal point $P_n(k)$ of the predetermined constellation of points is identified corresponding to the extracted symbol. A normalized error signal is then determined, in which the normalized error signal is representative of the amplitude jitter distortion based upon the extracted symbol and the corresponding signal point. Next, in a manner responsive to the normalized error signal, at least one subsequent extracted symbol is compensated for the amplitude jitter distortion, prior to the identification of the signal point corresponding to that subsequent extracted symbol. The compensation step may include tracking for amplitude jitter and providing the compensating signal, as previously discussed.

As previously discussed with regard to the apparatus of the present invention, the step of determining the normalized error signal includes deriving an error signal, E(k), based upon the difference between R(k) and $P_n(k)$, and projecting E(k) onto $P_n(k)$ to derive an unnormalized error signal. The unnormalized error signal is normalized to the absolute value of the signal point $P_n(k)$ to form the normalized error signal for use in the subsequent compensation step. Also as discussed hereinabove, the determination of the unnormalized error signal, $E_a(k)$, may be derived based on the following equation:

$$\frac{E_x P_x + E_y P_y + j(E_x P_y - E_y P_x)}{|P_n(k)|}$$

where:
$E_x$ = the inphase component of E(k);
$E_y$ = the quadrature component of E(k);
$P_x$ = the inphase component of $P_n(k)$;
$P_y$ = the quadrature component of $P_n(k)$.

The determining step may further include deriving a normalized error signal, $E_n(k)$, based on the following equation:

$$\frac{E_a(k)}{|P_n(k)|}.$$

Also as discussed above with regard to the amplitude jitter tracker, the method of the present invention includes matching the compensating signal to the amplitude jitter distortion of the extracted symbols such that the compensation thereof converges the corresponding error signal to a steady state value, preferably substantially zero. The amplitude jitter distortion may also include at least one sinusoidal component having a sinusoidal component amplitude and a sinusoidal component frequency, and as a consequence, the method of amplitude jitter tracking includes providing a compensating signal frequency value responsive to the error signal, providing a compensating signal amplitude value also responsive to the error signal, and combining the compensating signal frequency value and the compensating signal amplitude value to form a composite or overall compensating signal. Providing a compensating signal frequency value may also include matching the compensating signal frequency value to the sinusoidal component frequency such that compensation of subsequent extracted symbols with a compensating signal frequency value converges the corresponding error signals to substantially zero.

In addition, also as previously discussed, providing a compensating amplitude value may include matching the compensating signal amplitude value to the sinusoidal component amplitude such that compensation of subsequent extracted symbols with the compensating signal amplitude value converges the corresponding normalized error signals to substantially zero. The method may further comprise correlating the normalized error signal with the compensating signal frequency value to substantially remove any sinusoidal variations from the compensating signal amplitude value. The combining step may also include multiplying the compensating signal frequency value by the compensating signal amplitude value to provide the compensating signal. The compensating step may also include multiplying the extracted symbol with a signal based on the compensating signal to provide a compensated extracted symbol for use in identifying the signal point corresponding thereto.

In another embodiment of the method, the compensating step may further comprise linear prediction, responsive to the normalized error signal, for providing the compensating signal for compensating the at least one subsequent extracted symbol. The linear prediction step includes: compensating the normalized error signal with a signal based on the compensating signal to provide a first intermediate error signal, $E_A(k)$; combining the first intermediate error signal with a delayed compensating signal to provide a second intermediate error signal; conducting the second intermediate error signal through a plurality of tapped delay stages, the contents of each stage being operated on by a corresponding stage gain to provide a corresponding plurality of tapped output signals; updating the plurality of stage gains based on the first intermediate error signal; and combining the plurality of tapped output signals to provide the compensating signal. This method may include equalizing the extracted symbols to provide equalized extracted symbols in the identifying step, compensating the normalized error signal with the compensating signal to provide a compensated error signal, and adjusting the equalization based on the compensated error signal. The error signal compensation may also include multiplying the normalized error signal with a signal based on the compensating signal to provide a compensated error signal.

As explained hereinabove, jitter distortion includes both a phase component and an amplitude component. A major shortcoming of prior modem equalizers is that they have not addressed the problem of amplitude jitter distortion. At higher bit rates such as, for instance, 19.2 KBits per second, the amplitude jitter distortion is crucial to the satisfactory performance of the modem. For example, an amount of amplitude jitter distortion as low as 5% will cause relatively high levels of received bit errors, probably at least 3%. Thus, the bit error rate ("BER")=0.03. In modern communication applications, such a high bit error rate is normally unacceptable, and it would effectively mean that the modem could not be used in the desired application.

The present modem including an equalizer for amplitude jitter, in accordance with the present invention, combats this problem, however, by effectively compensating for at least ninety-nine percent (99%) of the unwanted amplitude jitter distortion. Stated otherwise, the amount of uncompensated amplitude jitter distortion remaining in the extracted symbols is reduced by a ratio of approximately 100 to 1.

Moreover, such a modem, in accordance with the present invention, provides an even greater improvement in performance when measured in terms of bit error rate, inasmuch as the corresponding bit errors in the received data stream will be reduced by an even more substantial ratio—an improvement, in fact, of at least a ratio of 10,000 to 1. Thus, the end user may be expected to enjoy a bit error rate of approximately 0.0003%. Thus, the BER=0.000003.

The over-all benefit to the user, of course, is obtaining a modem product that will work in a high-speed application. This is because, as a direct result of a modem in accordance with the present invention, the amplitude jitter distortion and corresponding bit rate are improved to a degree that modem speeds of 19.2 KBits per second, and perhaps greater, may reliably be achieved, with satisfactory levels of received bit errors.

While various embodiments of a modem including an equalizer for amplitude jitter, according to the present invention, have been described hereinabove, the scope of the invention is defined by the following claims.

What is claimed is:

1. A modem for receiving a signal, the signal including modulated symbols based on a predetermined constellation of points, each point representing a symbol, the modulated symbols including amplitude jitter distortion, the modem comprising:

means for extracting modulated symbols to provide an extracted symbol, R(k);

identifying means for identifying a signal point $P_n(k)$ of the predetermined constellation corresponding to the extracted symbol, based on a predetermined criterion;

determining means for determining a normalized error signal, $E_n(k)$, the normalized error signal being representative of the amplitude jitter distortion based on the extracted symbol and the signal point; and compensating means responsive to the normalized error signal, the compensating means generating a compensating signal for compensating at least one subsequent extracted symbol for the amplitude jitter distortion prior to the identifying means identifying the signal point corresponding thereto.

2. The modem of claim 1 wherein R(k) and $P_n(k)$ are complex signals including inphase and quadrature components, wherein the normalized error signal, $E_n(k)$, is derived from an error signal, E(k), the error signal E(k) being based on the difference between R(k) and $P_n(k)$, and wherein the determining means further comprises projecting means for projecting the error signal E(k) onto $P_n(k)$ to derive an unnormalized error signal, $E_a(k)$.

3. The modem of claim 2 wherein the determining means further comprises means for normalizing the unnormalized error signal to the absolute value of $P_n(k)$ to form the normalized error signal $E_n(k)$ for use by the compensating means.

4. The modem of claim 2 wherein the determining means further comprises means for deriving the unnormalized error signal, $E_a(k)$, based on the following equation:

$$\frac{E_x P_x + E_y P_y + \frac{1}{2}(E_x P_y - E_y P_x)}{|P_n(k)|}$$

where:
$E_x$=the inphase component of E(k);
$E_y$=the quadrature component of E(k);
$P_x$=the inphase component of $P_n(k)$;
$P_y$=the quadrature component of $P_n(k)$.

5. The modem of claim 2 wherein the determining means further comprises means for deriving the normalized error signal, $E_n(k)$, based on the following equation:

$$\frac{E_a(k)}{|P_n(k)|}.$$

6. The modem of claim 1 wherein the compensating means further comprises an amplitude jitter tracker responsive to the normalized error signal, the amplitude jitter tracker including means to provide a compensating signal for compensating the at least one subsequent extracted symbol.

7. The modem of claim 6 wherein the amplitude jitter tracker further comprises means, for matching the compensating signal to the amplitude jitter distortion of the extracted symbols such that compensation thereof converges the corresponding normalized error signals to a steady state value.

8. The modem of claim 7 wherein the steady state value is substantially zero.

9. The modem of claim 6 wherein the amplitude jitter distortion includes at least one sinusoidal component having a sinusoidal component amplitude and a sinusoidal component frequency, and wherein the amplitude jitter tracker further comprises:

providing means responsive to the error signal for providing a compensating signal frequency value and a compensating signal amplitude value; and combining means for combining the compensating signal frequency value and the compensating signal amplitude value to form a composite compensating signal.

10. The modem of claim 9 wherein the providing means further comprises means for matching the compensating signal frequency value to the sinusoidal component frequency such that compensation of subsequent extracted symbols with the compensating signal frequency value converges the corresponding normalized error signals to substantially zero.

11. The modem of claim 10 wherein the providing means further comprises a phase locked loop.

12. The modem of claim 9 wherein the providing means further comprises means for matching the compensating signal amplitude value to the sinusoidal component amplitude such that compensation of subsequent extracted symbols with the compensating signal amplitude value converges the corresponding normalized error signals to substantially zero.

13. The modem of claim 12 wherein the providing means further comprises an adaptive update filter.

14. The modem of claim 12 wherein the providing means further comprises means for correlating the normalized error signal with the compensating signal frequency value to substantially remove any sinusoidal variations from the compensating signal amplitude value.

15. The modem of claim 9 wherein the combining means further comprises means for multiplying the compensating signal frequency value by the compensating signal amplitude value to provide the compensating signal.

16. The modem of claim 6 wherein the compensating means further comprises means for multiplying the extracted symbol with a signal based on the compensating signal to provide a compensated extracted symbol for use by the identifying means to identify the signal point corresponding thereto.

17. The modem of claim 1 wherein the compensating means further comprises linear predictor means responsive to the normalized error signal for providing the compensating signal for compensating the at least one subsequent extracted symbol.

18. The modem of claim 17 wherein the linear predictor means further comprises:

means for compensating the normalized error signal with a signal based on the compensating signal to provide a first intermediate error signal, $E_A(k)$;

means for combining the first intermediate error signal with a delayed compensating signal to provide a second intermediate error signal;

delay line means having a plurality of tapped delay stages, the delay line means arranged to conduct the second intermediate error signal through the plurality of tapped delay stages thereof, the contents of each stage being operated on by a corresponding stage gain to provide a corresponding plurality of tapped output signals;

means for updating the plurality of stage gains based on the first intermediate error signal; and means for combining the plurality of tapped output signals to provide the compensating signal.

19. The modem of claim 17 further comprising equalizing means for equalizing the extracted symbols to provide equalized extracted symbols for use by the identifying means, error signal compensating means for compensating the normalized error signal with the compensating signal to provide a compensated error signal, and means for adjusting the equalizing means based on the compensated error signal.

20. The modem of claim 19 wherein the error signal compensating means further comprises means for multiplying the normalized error signal with a signal based on the compensating signal to provide a compensated error signal.

21. An equalizer arranged for use with a modem, the modem arranged for receiving a signal, the signal including modulated symbols based on a predetermined constellation of points, each point representing a symbol, the modulated symbols including amplitude jitter distortion, the modem having means for extracting modulated symbols to provide an extracted symbol, $R(k)$, and having identifying means for identifying a signal point $P_n(k)$ of the predetermined constellation corresponding to the extracted symbol, based on a predetermined criterion, the equalizer comprising:

determining means for determining a normalized error signal, $E_n(k)$, the normalized error signal being representative of the amplitude jitter distortion based on the extracted symbol and the signal point; and compensating means responsive to the normalized error signal, the compensating means generating a compensating signal for compensating at least one subsequent extracted symbol for the amplitude jitter distortion prior to the identifying means identifying the signal point corresponding thereto.

22. The equalizer of claim 21 wherein $R(k)$ and $P_n(k)$ are complex signals, including inphase and quadrature components, wherein the normalized error signal, $E_n(k)$, is derived from an error signal, $E(k)$, the error signal $E(k)$ being based on the difference between $R(k)$ and $P_n(k)$, and wherein the determining means further comprises projecting means for projecting the error signal $E(k)$ onto $P_n(k)$ to derive an unnormalized error signal, $E_a(k)$.

23. The equalizer of claim 22 wherein the determining means further comprises means for normalizing the unnormalized error signal to the absolute value of $P_n(k)$ to form the normalized error signal $E_n(k)$ for use by the compensating means.

24. The equalizer of claim 22 wherein the determining means further comprises means for deriving the unnormalized error signal, $E_a(k)$, based on the following equation:

$$\frac{E_x P_x + E_y P_y + \frac{1}{2}(E_x P_y - E_y P_x)}{|P_n(k)|}$$

where:
$E_x$ = the inphase component of $E(k)$;
$E_y$ = the quadrature component of $E(k)$;
$P_x$ = the inphase component of $P_n(k)$;
$P_y$ = the quadrature component of $P_n(k)$.

25. The equalizer of claim 24 wherein the determining means further comprises means for deriving the normalized error signal, $E_n(k)$, based on the following equation:

$$\frac{E_a(k)}{|P_n(k)|}.$$

26. The equalizer of claim 21 wherein the compensating means comprises an amplitude jitter tracker responsive to the normalized error signal, the amplitude jitter tracker including means to provide a compensating signal for compensating the at least one subsequent extracted symbol.

27. The equalizer of claim 26 wherein the amplitude jitter tracker further comprises means for matching the compensating signal to the amplitude jitter distortion of the extracted symbols such that compensation thereof converges the corresponding normalized error signals to a steady state value.

28. The equalizer of claim 27 wherein the steady state value is substantially zero.

29. The equalizer of claim 26 wherein the amplitude jitter distortion includes at least one sinusoidal component having a sinusoidal component amplitude and a sinusoidal component frequency, and wherein the amplitude jitter tracker further comprises:
providing means responsive to the error signal for providing a compensating signal frequency value and a compensating signal amplitude value; and
combining means for combining the compensating signal frequency value and the compensating signal amplitude value to form a composite compensating signal.

30. The equalizer of claim 29 wherein the providing means further comprises means for matching the compensating signal frequency value to the sinusoidal component frequency such that compensation of subsequent extracted symbols with the compensating signal frequency value converges the corresponding normalized error signals to substantially zero.

31. The equalizer of claim 30 wherein the providing means comprises a phase locked loop.

32. The equalizer of claim 29 wherein the providing means further comprises means for matching the compensating signal amplitude value to the sinusoidal component amplitude such that compensation of subsequent extracted symbols with the compensating signal amplitude value converges the corresponding normalized error signals to substantially zero.

33. The equalizer of claim 32 wherein the providing means comprises an adaptive update filter.

34. The equalizer of claim 32 wherein the providing means further comprises means for correlating the normalized error signal with the compensating signal frequency value to substantially remove any sinusoidal variations from the compensating signal amplitude value.

35. The equalizer of claim 29 wherein the combining means further comprises means for multiplying the compensating signal frequency value by the compensating signal amplitude value to provide the compensating signal.

36. The equalizer of claim 29 wherein the compensating means further comprises means for multiplying the extracted symbol with a signal based on the compensating signal to provide a compensated extracted symbol for use by the identifying means to identify the signal point corresponding thereto.

37. The equalizer of claim 21 wherein the compensating means further comprises linear predictor means responsive to the normalized error signal for providing the compensating signal for compensating the at least one subsequent extracted symbol.

38. The equalizer of claim 37 wherein the linear predictor means comprises:
means for compensating the normalized error signal with a signal based on the compensating signal to provide a first intermediate error signal, $E_A(k)$;
means for combining the first intermediate error signal with a delayed compensating signal to provide a second intermediate error signal;
delay line means having a plurality of tapped delay stages, the delay line means arranged to conduct the second intermediate error signal through the plurality of tapped delay stages thereof, the contents of each stage being operated on by a corresponding stage gain to provide a corresponding plurality of tapped output signals;
means for updating the plurality of stage gains based on the first intermediate error signal; and
means for combining the plurality of tapped output signals to provide the compensating signal.

39. The equalizer of claim 37 further comprising equalizing means for equalizing the extracted symbols to provide equalized extracted symbols for use by the identifying means, error signal compensating means for compensating the normalized error signal with the compensating signal to provide a compensated error signal, and means for adjusting the equalizing means based on the compensated error signal.

40. The equalizer of claim 39 wherein the error signal compensating means further comprises means for multiplying the normalized error signal with a signal based on the compensating signal to provide a compensated error signal.

41. A method of equalizing for amplitude jitter distortion in a data communication device arranged for receiving a signal, the signal including modulated symbols based on a predetermined constellation of points, each point representing a symbol, the modulated symbols including the amplitude jitter distortion, the method of equalizing for the amplitude jitter comprising:
(a) extracting modulated symbols to provide an extracted symbol, $R(k)$;
(b) identifying a signal point $P_n(k)$ of the predetermined constellation corresponding to the extracted symbol, based on a predetermined criterion;
(c) determining a normalized error signal, $E_n(k)$, the normalized error signal being representative of the amplitude jitter distortion based on the extracted symbol and the signal point; and
(d) compensating for the amplitude jitter by generating a compensating signal, responsive to the normalized error signal, for compensating at least one subsequent extracted symbol for the amplitude jitter distortion prior to identifying the signal point corresponding thereto.

42. The method of claim 41 wherein $R(k)$ and $P_n(k)$ are complex signals including inphase and quadrature components, and wherein the determining step (c) further comprises deriving the normalized error signal, $E_n(k)$, from an error signal, $E(k)$, the error signal $E(k)$ being based on the difference between $R(k)$ and $P_n(k)$, and projecting the error signal E(k) onto $P_n(k)$ to devise an unnormalized error signal, $E_a(k)$.

43. The method of claim 42 wherein the determining step (c) further comprises normalizing the unnormalized error signal to the absolute value of $P_n(k)$ to form the normalized error signal $E_n(k)$ for use in the compensating step (d).

44. The method of claim 42 wherein the determining step (c) further comprises deriving the unnormalized error signal, $E_a(k)$, based on the following equation:

$$\frac{E_x P_x + E_y P_y + j(E_x P_y - E_y P_x)}{|P_n(k)|}$$

where:
$E_x$=the inphase component of E(k);
$E_y$=the quadrature component of E(k);
$P_x$=the inphase component of $P_n(k)$;
$P_y$=the quadrature component of $P_n(k)$.

45. The method of claim 42 wherein the determining step (c) further comprises deriving the normalized error signal, $E_n(k)$, based on the following equation:

$$\frac{E_a(k)}{|P_n(k)|}.$$

46. The method of claim 41 wherein the compensating step (d) further comprises:
(d1) tracking the amplitude jitter, responsively to the normalized error signal, the amplitude jitter tracking including providing a compensating signal for compensating the at least one subsequent extracted symbol.

47. The method of claim 46 wherein the amplitude jitter tracking further comprises; matching the compensating signal to the amplitude jitter distortion of the extracted symbols such that compensation thereof converges the corresponding normalized error signals to a steady state value.

48. The method of claim 47 wherein the steady state value is substantially zero.

49. The method of claim 46 wherein the amplitude jitter distortion includes at least one sinusoidal component having a sinusoidal component amplitude and a sinusoidal component frequency, and wherein the amplitude jitter tracking step (d1) further comprises:
(d2) providing a compensating signal frequency value and a compensating signal amplitude value, responsive to the error signal; and
(d3) combining the compensating signal frequency value and the compensating signal amplitude value to form a composite compensating signal.

50. The method of claim 49 wherein the providing step (d2) further comprises matching the compensating signal frequency value to the sinusoidal component frequency such that compensation of subsequent extracted symbols with the compensating signal frequency value converges the corresponding normalized error signals to substantially zero.

51. The method of claim 50 further comprising correlating the normalized error signal with the compensating signal frequency value to substantially remove any sinusoidal variations from the compensating signal amplitude value.

52. The method of claim 49 wherein the providing step (d2) further comprises matching the compensating signal amplitude value to the sinusoidal component amplitude such that compensation of subsequent extracted symbols with the compensating signal amplitude value converges the corresponding normalized error signals to substantially zero.

53. The method of claim 49 wherein the combining step (d3) further comprises multiplying the compensating signal frequency value by the compensating signal amplitude value to provide the compensating signal.

54. The method of claim 46 wherein the compensating step (d) further comprises multiplying the extracted symbol with a signal based on the compensating signal to provide a compensated extracted symbol for use in identifying step (b) to identify the signal point corresponding thereto.

55. The method of claim 41 wherein the compensating step (d) further comprises linear prediction, responsive to the normalized error signal, for providing the compensating signal for compensating the at least one subsequent extracted symbol.

56. The method of claim 55 wherein the linear prediction step further comprises:
compensating the normalized error signal with a signal based on the compensating signal to provide a first intermediate error signal, $E_A(k)$;
combining the first intermediate error signal with a delayed compensating signal to provide a second intermediate error signal;
conducting the second intermediate error signal through a plurality of tapped delay stages, the contents of each stage being operated on by a corresponding stage gain to provide a corresponding plurality of tapped output signals;
updating the plurality of stage gains based on the first intermediate error signal; and
combining the plurality of tapped output signals to provide the compensating signal.

57. The method of claim 55 further comprising equalizing the extracted symbols to provide equalized extracted symbols in the identifying step (b), compensating the normalized error signal with the compensating signal to provide a compensated error signal, and adjusting the equalizing means based on the compensated error signal.

58. The method of claim 57 wherein the error signal compensation further comprises; multiplying the normalized error signal with a signal based on the compensating signal to provide a compensated error signal.

59. A modem for receiving a signal, the signal including modulated symbols based on a predetermined constellation of points, each point representing a symbol, the modem including:
means for extracting modulated symbols to provide an extracted symbol, R(k), the; extracted symbol including amplitude jitter distortion,
identifying means for identifying a signal point $P_n(k)$ of the predetermined constellation of points corresponding to the extracted symbol, based on a predetermined criteria;
determining means for determining an error signal, said error signal being representative of the amplitude jitter distortion based on the extracted symbol and the signal point;
compensating means responsive to the error signal for compensating at least one subsequent extracted symbol for the amplitude jitter distortion prior to the identifying means identifying the signal point corresponding thereto; and the compensating means includes linear predictor means responsive to the error signal for providing a compensating signal for compensating at least one subsequent extracted symbol.

60. The modem of claim 59 wherein the linear predictor means includes:
means for compensating the error signal with a signal based on the compensating signal to provide an intermediate error signal;
means for combining the intermediate error signal with a delayed compensating signal to provide a second intermediate error signal;
delay line means having a plurality of tapped delay stages, the delay line means arranged to conduct the second intermediate error signal through the plurality of tapped delay stages thereof, the contents of each stage being operated on by a corresponding stage gain to provide a corresponding plurality of tapped output signals;
means for updating the plurality of stage gains based on the intermediate error signal; and
means for combining the plurality of tapped output signals to provide the compensating signal.

61. The modem of claim 59 including equalizing means for equalizing the extracted symbols to provide equalized extracted symbols for use by the identifying means, error signal compensating means for compensating the error signal with the compensating signal to provide a compensated error signal, and means for adjusting the equalizing means based on the compensated error signal.

62. The modem of claim 59 wherein the error signal compensating means includes means for multiplying the error signal with a signal based on the compensating signal to provide a compensated error signal.

63. An equalizer arranged for use with a modem, the modem arranged for receiving a signal transported by a channel, the signal including modulated symbols based on a predetermined constellation of points, each point representing a symbol, the modem including:
means for extracting modulated symbols to provide an extracted symbol, R(k), the extracted symbol including amplitude jitter distortion,
identifying means for identifying a signal point $P_n(k)$ of the predetermined constellation corresponding to the extracted symbol, based on a predetermined criteria;
the equalizer including:
determining means for determining an error signal representative of the amplitude jitter distortion based on the extracted symbol and the signal point; and
compensating means responsive to the error signal for compensating at least one subsequent extracted symbol for the amplitude jitter distortion prior to the identifying means identifying the signal point corresponding thereto; and
the compensating means including linear predictive means responsive to the error signal for providing a compensating signal for compensating at least one subsequent extracted symbol.

64. The equalizer of claim 63 wherein the linear predictor means includes:
means for compensating the error signal with a signal based on the compensating signal to provide an intermediate error signal;
means for combining the intermediate error signal with a delayed compensating signal to provide a second intermediate error signal;
delay line means having a plurality of tapped delay stages, the delay line means arranged to conduct the second intermediate error signal through the plurality of tapped delay stages thereof, the contents of each stage being operated on by a corresponding stage gain to provide a corresponding plurality of tapped output signals;
means for updating the plurality of stage gains based on the intermediate error signal; and
means for combining the plurality of tapped output signals to provide the compensating signal.

65. The equalizer of claim 63 including equalizing means for equalizing the extracted symbols to provide equalized extracted symbols for use by the identifying means, error signal compensating means for compensating the error signal with the compensating signal to provide a compensated error signal, and means for adjusting the equalizing means based on the compensated error signal.

66. The equalizer of claim 63 wherein the error signal compensating means includes means for multiplying the error signal with a signal based on the compensating signal to provide a compensated error signal.

* * * * *